US 6,603,500 B2

(12) United States Patent
Kato

(10) Patent No.: US 6,603,500 B2
(45) Date of Patent: Aug. 5, 2003

(54) SCANNING OPTICAL APPARATUS WITH ASPHERICALLY-SHAPED SURFACE IN MAIN SCANNING DIRECTION

(75) Inventor: Manabu Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/945,730

(22) Filed: Sep. 5, 2001

(65) Prior Publication Data

US 2002/0057331 A1 May 16, 2002

(30) Foreign Application Priority Data

Sep. 13, 2000 (JP) ........................................ 2000/277865

(51) Int. Cl.$^7$ ............................................... B41J 27/00
(52) U.S. Cl. ........................................ 347/258; 347/244
(58) Field of Search ............................. 347/258, 259, 347/241, 244, 256; 359/204, 205, 207

(56) References Cited

U.S. PATENT DOCUMENTS

| 4,802,721 | A |   | 2/1989  | Fujita ............................ 359/212 |
| 4,973,995 | A |   | 11/1990 | Kato et al. ..................... 396/71  |
| 5,541,760 | A | * | 7/1996  | Iizuka .......................... 359/207 |
| 5,801,746 | A | * | 9/1998  | Yamaguchi et al. ........... 347/259 |
| 5,838,480 | A | * | 11/1998 | McIntyre et al. ............. 359/205 |
| 6,104,548 | A |   | 8/2000  | Nakayama et al. ........... 359/690 |
| 6,133,935 | A |   | 10/2000 | Fujibayashi et al. .......... 347/258 |
| 6,347,003 | B1| * | 2/2002  | Shiraishi et al. ............. 359/204 |

FOREIGN PATENT DOCUMENTS

| JP | 61-87123  | 5/1986 |
| JP | 10-232347 | 9/1998 |

* cited by examiner

Primary Examiner—Hai Pham
(74) Attorney, Agent, or Firm—Fitzpatrick, Cella, Harper & Scinto

(57) ABSTRACT

A scanning optical apparatus includes a light source, a deflecting element for deflecting and reflecting a beam emitted from the light source, and a scanning optical element for focusing the beam deflected by the deflecting element, on a surface to be scanned. The scanning optical element includes a plurality of optical elements. A shape in a main scanning direction of at least one surface out of optical surfaces of the plurality of optical elements is an aspheric shape. An optical element having a largest power in a sub scanning direction on the optical axis out of the plurality of optical elements is located on the deflecting element side with respect to a middle point in an optical-axis direction between the deflecting element and the surface to be scanned. The optical element having the largest power in the sub scanning direction has two optical surfaces. Where $\phi S_1$ represents a power in the sub scanning direction of the optical element having the largest power in the sub scanning direction and $\phi S_{1X}$ a power of an optical surface having a smaller power in the sub scanning direction out of the two optical surfaces of the optical element having the largest power in the sub scanning direction, the powers $\phi S_1$ and $\phi S_{1X}$ satisfy $\phi S_{1X} < 0.2 \times \phi S_1$.

23 Claims, 8 Drawing Sheets

SCANNING OPTICAL APPARATUS WITH ASPHERICALLY-SHAPED SURFACE IN MAIN SCANNING DIRECTION

BACKGROUND OF THE INVENTION

1. Field of the Invention

The present invention relates to a scanning optical apparatus and color image-forming apparatus using it and, particularly, is suitably applicable to apparatuses, for example, such as laser beam printers, digital copying machines, multi-function printers, and so on involving the electrophotographic process, which are constructed to deflect a beam emitted from a light source means, by a deflecting element consisting of a rotary polygon mirror and then guide the beam through a scanning lens system having the f-θ characteristic, to optically scan an area on a surface to be scanned, thereby recording image information thereon.

2. Related Background Art

In the conventional scanning optical apparatus used in laser beam printers (LBPs), the digital copying machines, etc., the beam optically modulated according to an image signal and emitted from the light source means is periodically deflected by an optical deflector, for example, consisting of a rotary polygon mirror (polygon mirror), is focused in a spot shape on a surface of a photosensitive recording medium (photosensitive drum) by the scanning lens system having the f-θ characteristic, and is moved to optically scan the area on the surface to record an image thereon.

FIG. 12 is a schematic view of major part of a conventional scanning optical apparatus, for example, proposed in U.S. Pat. No. 6,133,935 (correspondent of Japanese Patent Application Laid-Open No. 10-232347).

In the same figure a divergent beam emitted from light source means 91 is collimated into a nearly parallel beam by collimator lens 92 and the beam (light amount) is limited by stop 93 to enter a cylinder lens (cylindrical lens) 94 having a predetermined refracting power only in the sub scanning direction. In the main scanning section the nearly parallel beam entering the cylinder lens 94 emerges in the nearly parallel beam state as it is. In the sub scanning section the beam is converged to be focused as a nearly linear image on a deflective facet 95a of the optical deflector 95 consisting of the rotary polygon mirror (polygon mirror).

Then the beam deflected and reflected by the deflective facet 95a of the optical deflector 95 is guided through the scanning lens system 106 having the f-θ characteristic, onto the photosensitive drum surface 98 as a surface to be scanned, and the optical deflector 95 is rotated in the direction of arrow A to optically scan the area on the photosensitive drum surface 98 in the direction of arrow B. This implements recording of an image on the photosensitive drum surface 98 being a recording medium.

In the above-stated scanning optical apparatus the scanning lens system 106 is composed of two toric lenses 96, 97 and in the same example all the surfaces (four surfaces) of the two lenses 96, 97 are toric surfaces, thereby correcting various aberrations well.

In general a lens having a large power in the sub scanning direction or an optical element disposed in the vicinity of the optical deflector demonstrates high sensitivity to optical decentration caused during production.

FIG. 13 is a chart showing movement of irradiated position on the surface to be scanned, for example, due to decentration (decentration amount of 0.05 mm) in the sub scanning direction of the optical surfaces of the first toric lens in Example 1 of U.S. Pat. No. 6,133,935. In the specification of the present application the "decentration" in the sub scanning direction means decentration in the direction normal to the surface to be scanned.

It is apparent from the same figure that the irradiated position moves largely due to the decentration in the sub scanning direction of the toric lens with the largest power in the sub scanning direction and it will pose a problem in recording of high-definition images. This decentration does not affect only the irradiated position but also affects imaging performance. In this optical system a large decentration amount will considerably degrade the spot shape on the surface to be scanned.

This problem may lead to degradation of imagery, because the movement of irradiated position due to decentration causes jitter, pitch unevenness, and color registration, particularly, in the multi-beam scanning optical apparatus for simultaneously scanning the surface with a plurality of beams from a multi-beam light source as a light source, the color image-forming apparatus for guiding beams emitted from a plurality of scanning optical devices, onto image carrier surfaces corresponding to respective colors, to record a color image, and so on.

Further, in the case of optical elements produced by plastic molding or glass molding, in addition to the total decentration of the optical surface, there is a possibility that partial (local) optical decentration can occur depending upon accuracy of mirror finish of a mold. For these reasons, the scanning optical systems with high sensitivity to decentration are not preferable in terms of achievement of higher image quality and improvement in productivity of the scanning optical apparatus. Therefore, there are desires for a scanning optical system permitting good aberration correction and reduced in the sensitivity to decentration.

In the scanning optical apparatus proposed in Japanese Patent Application Laid-Open No. 61-87123, the power in the sub scanning direction is concentrated in an optical element placed in the vicinity of the surface to be scanned, so as to decrease the power in the sub scanning direction of the scanning lens system, thereby reducing the sensitivity to decentration.

The scanning optical apparatus of this reducing system in the sub scanning direction, however, is not suitable for recording of high-definition imagery for the following reasons; a stop normally becomes oblate because of setting of its magnification, coupling efficiency of the collimator lens becomes lower, so as to decrease the light amount, the shape of the stop is close to a rectangle, so as to make the spot shape worse, and so on.

SUMMARY OF THE INVENTION

An object of the present invention is to provide a scanning optical apparatus suitably applicable to formation of high-quality imagery with little pitch unevenness, little color registration, or the like by properly setting shapes, powers, etc. of plural optical elements constituting a third optical element for focusing a beam deflected by a deflecting element on a surface to be scanned and thereby reducing the problems of the movement of irradiated position and the degradation of the spot due to the deviation in the sub scanning direction of the third optical element at low cost and in a simple configuration, and also provide a color image-forming apparatus using the scanning optical apparatus.

In one aspect of the invention, there is provided a scanning optical apparatus comprising light source means, a deflecting element for deflecting and reflecting a beam emitted from the light source means, and a scanning optical element for focusing the beam deflected by the deflecting element, on a surface to be scanned, wherein the scanning optical element comprises a plurality of optical elements, wherein a shape in a main scanning direction of at least one surface out of optical surfaces of the plurality of optical elements is an aspheric shape, wherein an optical element having a largest power in a sub scanning direction on the optical axis out of the plurality of optical elements is located on the deflecting element side with respect to a middle point in an optical-axis direction between the deflecting element and the surface to be scanned, wherein the optical element having the largest power in the sub scanning direction has two optical surfaces, wherein, where $\phi S_1$ represents a power in the sub scanning direction of the optical element having the largest power in the sub scanning direction and $\phi S_{1X}$ a power of an optical surface having a smaller power in the sub scanning direction out of the two optical surfaces of the optical element having the largest power in the sub scanning direction, the powers $\phi S_1$ and $\phi S_{1X}$ satisfy the following condition:

$\phi S_{1X} < 0.2 \times \phi S_1$.

In a further aspect of the scanning optical apparatus, the optical element having the largest power in the sub scanning direction is located at a position closest to the deflecting element in the optical-axis direction.

In a further aspect of the scanning optical apparatus, only the optical element having the largest power in the sub scanning direction on the optical axis out of the plurality of optical elements is located on the deflecting element side with respect to the middle point in the optical-axis direction between the deflecting element and the surface to be scanned.

In a further aspect of the scanning optical apparatus, a shape in the main scanning direction of at least one surface out of the two optical surfaces of the optical element having the largest power in the sub scanning direction is an aspheric shape.

In a further aspect of the scanning optical apparatus, the power $\phi S_{1X}$ of the optical surface having the smaller power in the sub scanning direction out of the two optical surfaces of the optical element having the largest power in the sub scanning direction, is 0.

In a further aspect of the scanning optical apparatus, an optical element other than the optical element having the largest power in the sub scanning direction out of the plurality of optical elements, also has an optical surface a power of which in the sub scanning direction on the optical axis is less than 20% of the power $\phi S_1$ in the sub scanning direction of the optical element having the largest power in the sub scanning direction.

In a further aspect of the scanning optical apparatus, concerning all refracting surfaces of the optical elements except for the optical element having the largest power in the sub scanning direction out of the plurality of optical elements, powers thereof in the sub scanning direction on the optical axis are less than 20% of the power $\phi S_1$ in the sub scanning direction of the optical element having the largest power in the sub scanning direction.

In a further aspect of the scanning optical apparatus, the optical element having the largest power in the sub scanning direction is a molded lens.

In a further aspect of the scanning optical apparatus, the scanning optical element comprises a diffracting optical element.

In a further aspect of the scanning optical apparatus, shapes in the main scanning direction of both of the two optical surfaces of the optical element having the largest power in the sub scanning direction, are aspheric shapes.

In a further aspect of the scanning optical apparatus, the light source means is a multi-beam light source having a plurality of light emitting portions capable of being optically modulated independently of each other.

In another aspect of the invention, there is provided an image-forming apparatus comprising the scanning optical apparatus as set forth in any one of the foregoing scanning optical apparatuses, a photosensitive member placed at the surface to be scanned, a developing unit for developing an electrostatic latent image formed on the photosensitive member with a beam under scan by the scanning optical apparatus, into a toner image, a transferring unit for transferring the toner image thus developed, onto a transfer medium, and a fixing unit for fixing the toner image thus transferred, on the transfer medium.

In still another aspect of the invention, there is provided an image-forming apparatus comprising the scanning optical apparatus as set forth in any one of the foregoing scanning optical apparatuses, and a printer controller for converting code data supplied from an external device, into an image signal and for supplying the image signal into the scanning optical apparatus.

In still another aspect of the invention, there is provided a color image-forming apparatus comprising a plurality of scanning optical apparatus as set forth in any one of the foregoing scanning optical apparatuses, wherein a plurality of beams emitted from the respective scanning optical apparatus are guided onto a plurality of corresponding image carrier surfaces and areas on the plurality of image carrier surfaces are scanned with the respective beams to form a color image.

DETAILED DESCRIPTION OF THE PREFERRED EMBODIMENTS (Embodiment 1)

Figure 1:
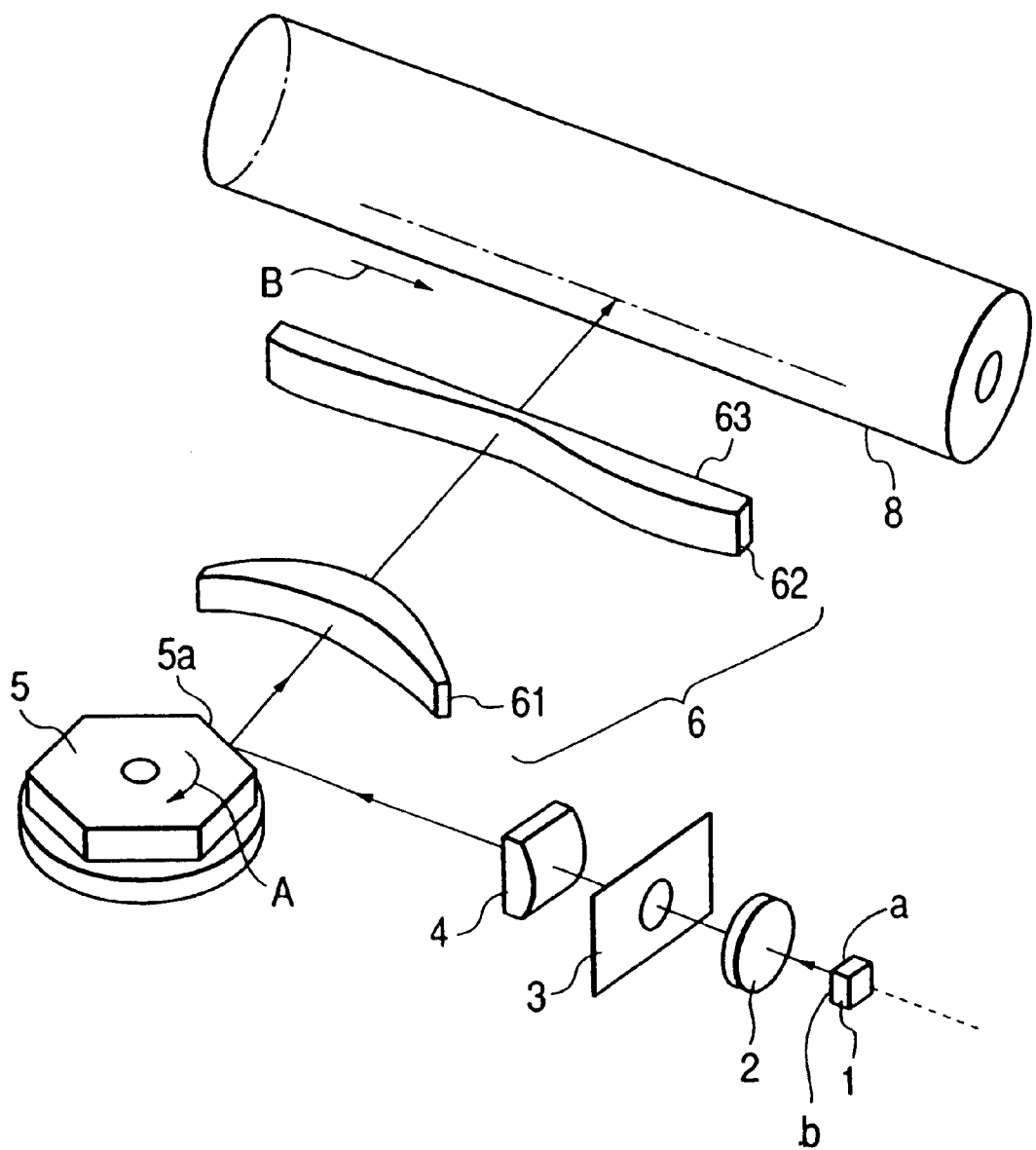
FIG. 1 is a schematic view showing the major part of the scanning optical apparatus in Embodiment 1 of the present invention.
Figure 2:
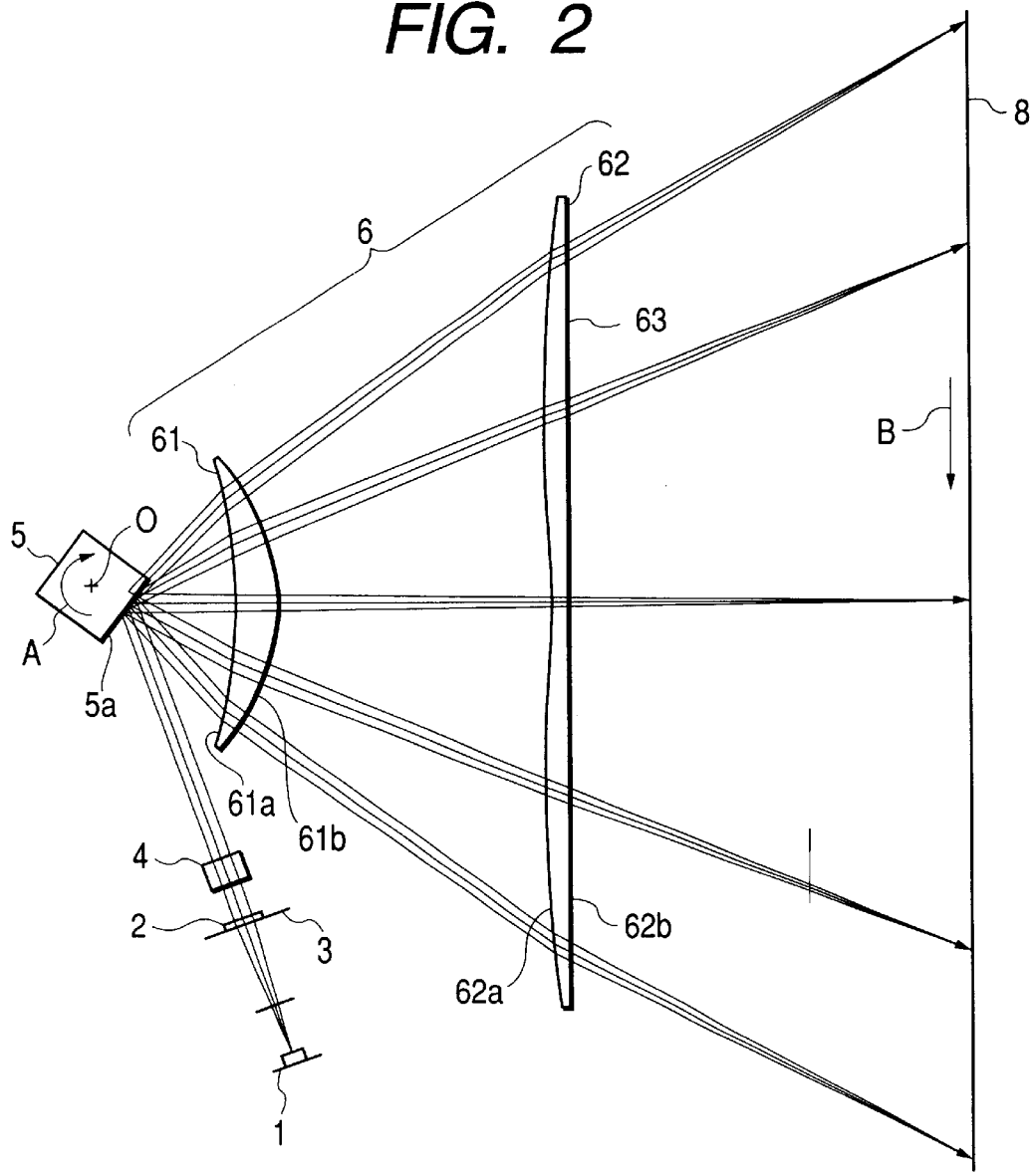
FIG. 2 is a main scanning sectional view of the scanning optical apparatus in Embodiment 1 of the present invention.
Figure 3:
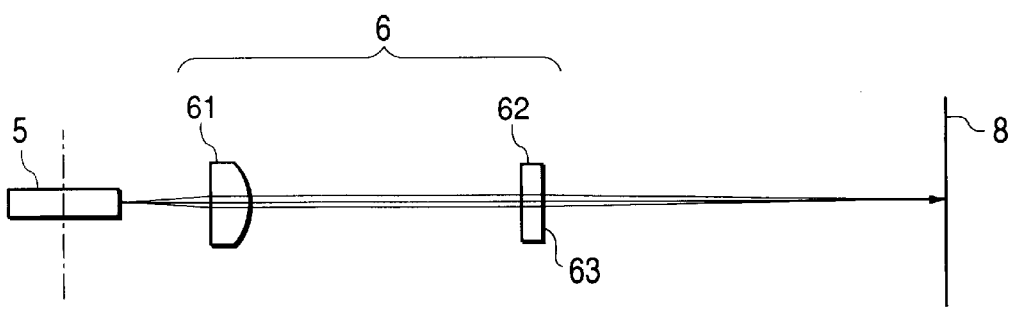
FIG. 3 is a sub scanning sectional view of the scanning optical apparatus in Embodiment 1 of the present invention.

FIG. 1 is a schematic view showing the major part of Embodiment 1 of the scanning optical apparatus according to the present invention, FIG. 2 a cross-sectional view of the major part in the main scanning direction of Embodiment 1 of the present invention (a main scanning sectional view), and FIG. 3 a cross-sectional view of the major part in the sub scanning direction of Embodiment 1 according to the present invention (a sub scanning sectional view). The main scanning direction herein refers to a direction in which the beam is deflected to scan by the deflective facet of the optical deflector. The main scanning section refers to a beam plane that the beam deflected by the deflective facet of the optical deflector forms with a lapse of time.

In the figures, reference numeral 1 designates a light source means, which consists of a multi-beam light source (multi-beam semiconductor laser) having a plurality of light emitting regions (a and b) capable of being optically modulated independently of each other. Numeral 2 denotes a collimator lens as a first optical element, which converts a plurality of beams (light beams) emitted from the light source means 1, into nearly parallel beams. Numeral 3 indicates an aperture stop, which limits passing beams (light amounts). Numeral 4 represents a cylindrical lens as a second optical element, which has a predetermined refracting power only in the sub scanning direction and which focuses the plurality of beams having passed through the aperture stop 3, to form nearly linear images on a deflective facet 5a of optical deflector 5 described hereinafter, in the sub scanning section.

Numeral 5 denotes the optical deflector, for example, consisting of a polygon mirror (rotary polygon mirror), which is rotated at a constant speed in the direction of arrow A in the figure by a driving means such as a motor (not shown).

Numeral 6 represents a scanning lens system (scanning optical element) as a third optical element having the f-θ characteristic, which has a refracting optical element 61 and diffracting optical element 62.

The refracting optical element 61 consists of a single plastic toric lens having mutually different powers in the main scanning direction and in the sub scanning direction, two lens surfaces 61a, 61b of the toric lens 61 both are of aspherical shape in the main scanning direction, and the power in the sub scanning direction on the optical axis of at least one surface (the entrance surface 61a in the present embodiment) is 0. The toric lens 61 is comprised of a molded lens.

The diffracting optical element 62 consists of a plastic, long, composite optical element (long diffracting element) having mutually different powers in the main scanning direction and in the sub scanning direction, and the composite optical element 62 is so constructed that a surface 62a on the incidence side consists of an aspherical surface having a predetermined power only in the main scanning direction (which is flat in the sub scanning direction) and that a surface 62b on the exit side consists of a diffractive surface resulting from addition of a diffraction grating 63 onto a plane.

The shape of the diffraction grating 63 herein can be suitably selected, for example, from the shape of the Fresnel grating surface consisting of a diffraction grating of sawtooth shape made by surface ablation, the shape of a stepped diffraction grating made by photoetching, and so on. In the present embodiment the composite optical element 62 is a plastic element made by injection molding, but the element 62 does not have to be limited to this; for example, equivalent effect can also be attained by making the diffraction grating on a glass base by a replica process.

In the present embodiment the toric lens 61 having the largest power in the sub scanning direction on the optical axis in the scanning lens system 6 is located on the optical deflector 5 side with respect to a middle point between the rotational axis O of the optical deflector 5 and the photosensitive drum surface 8, and the composite optical element 62 on the photosensitive drum surface 8 side. The scanning lens system 6 functions to focus the beams based on image information, deflected by the optical deflector 5, on the photosensitive drum surface 8 and correct surface inclination of the deflective facet 5a of the optical deflector 5 in the sub scanning section.

In the present embodiment the plurality of divergent beams emitted from the multi-beam light source 1 (only one of which is illustrated in the figures hereinafter) are converted into parallel beams or nearly parallel beams (which will be referred to hereinafter as nearly parallel beams) by the collimator lens 2 and the beams (light amounts) are limited by the aperture stop 3 to enter the cylindrical lens 4. The nearly parallel beams entering the cylindrical lens 4 emerge in the as-entering state in the main scanning section. In the sub scanning section including the optical axis and being perpendicular to the main scanning section, the beams are converged to be focused to form nearly linear images (linear images elongated in the main scanning direction) on the deflective facet 5a of the optical deflector 5. Then the plurality of beams deflected by the deflective facet 5a of the optical deflector 5 are guided through the scanning lens system 6 onto the photosensitive drum surface 8. The optical deflector 5 is rotated in the direction of arrow A, whereby the beams optically scan the area on the photosensitive drum surface 8 in the direction of arrow B. This implements recording of an image on the photosensitive drum surface 8 being a recording medium.

In the present embodiment each of the shapes of the toric lens 61 and the composite optical element 62 constituting the scanning lens system 6 is expressed by the following equations.

(1) Refractive surfaces: aspheric shapes sections of which in the main scanning direction can be expressed by functions up to the tenth order Let us define a coordinate system wherein the origin is set at an intersection with the optical axis, the x-axis is taken along the direction of the optical axis, the y-axis along an axis perpendicular to the optical axis in the main scanning plane, and the z-axis along an axis perpendicular to the optical axis in the sub scanning plane.

Sectional shapes in the meridional direction corresponding to the main scanning direction are expressed by the following equation.

$$x=[(Y^2/R)/\{1+(1-(1+K)(Y/R^2))^{1/2}\}]+B_4Y^4+B_6Y^6+B_8Y^8+B_{10}Y^{10}$$

(where R is a radius of curvature on the optical axis, and K, $B_4$, $B_6$, $B_8$, and $B_{10}$ are aspheric coefficients)

Sectional shapes in the sagittal direction corresponding to the sub scanning direction (the direction including the optical axis and being perpendicular to the main scanning direction) are expressed by the following equation.

$$S=(Z^2/r')/\{1+(1-(Z/r')^2)^{1/2}\}$$

degrees of power series, the effect of the present invention can also be achieved even with increase or decrease in the degrees.

Table 1 presents the optical layout, the aspheric coefficients of the toric lens 61, and the aspheric coefficients and phase terms of the composite optical element 62 in the present embodiment.

TABLE 1

Design Data

| Wavelength & Refractive indices | | | Surface shapes of toric lens 61 | | | Surface shapes of long diffractive element 62 | |
|---|---|---|---|---|---|---|---|
| Working wavelength | λ (nm) | 780 | | First surface | Second Surface | | First surface | Second surface |
| Refractive index of toric lens 61 | ndt | 1.53064 | R | −8.84696E+01 | −4.63992E+01 | R | −3.92336E+02 | ∞ |
| Abbe number of toric lens 61 | vdt | 55.5 | K | −5.39190E−01 | −8.46048E−01 | K | −6.01601E+01 | |
| Refractive index of long diffractive element 62 | ndd | 1.53064 | B4 | 1.16004E−06 | 3.12272E−07 | B4 | 2.11808E−07 | |
| Abbe number of long diffractive element 62 | vdd | 55.5 | B6 | 1.34535E−09 | 5.20228E−10 | B6 | −2.03707E−11 | |
| Angles of beam | | | B8 | −1.08687E−12 | 5.33696E−13 | B8 | 1.13519E−15 | |
| Angle of incidence to polygon | θp | −70.0 | B10 | 1.83812E−16 | −3.91099E−16 | B10 | −2.89613E−20 | |
| Max angle of exit from polygon | θe | 45.0 | r | 0.00000E+00 | −2.08560E+01 | Phase function of long diffractive element 62 | | |
| | | | D2s | | 1.78591E−04 | | First surface | Second surface |
| Layout | | | D4s | | −2.17176E−07 | b2 | | −2.00698E−04 |
| Polygon facet - Toric lens | e1 | 30.0 | D6s | | 4.20061E−10 | b4 | | 1.44782E−08 |
| Center thickness of toric lens | d1 | 11.0 | D8s | | −3.73355E−13 | b6 | | −2,67807E−12 |
| Toric lens - Long diffractive element | e2 | 75.0 | D10s | | 1.25200E−16 | b8 | | 2.30099E−16 |
| Center thickness of long diffractive element | d2 | 5.0 | D2e | | 8.95133E−05 | b10 | | −7.63301E−21 |
| Long diffractive element - Surface to be scanned | Sk | 111.0 | D4e | | 4.28083E−08 | d0 | | −5.09781E−03 |
| Axis of polygon - Surface to be scanned | L | 232.0 | D6e | | −3.82945E−11 | d1 | | 1.25290E−06 |
| Effective scan width | W | 297.0 | D8e | | −1.52100E−14 | d2 | | 6.76626E−08 |
| | | | D10e | | 2.36360E−17 | d3 | | −4.89815E−11 |
| | | | | | | d4 | | 1.82819E−13 |

Suffix s stands for anti–laser side
Suffix e stands for laser side
Sign + on Y axis is defined on anti–laser side In this equation, $$r'=r_0(1+D_2Y^2+D_4Y^4+D_6Y^6+D_8Y^8+D_{10}Y^{10})$$

(where $r_0$ is a radius of sagittal curvature on the optical axis, and $D_2$, $D_4$, $D_6$, $D_8$, and $D_{10}$ are aspheric coefficients).

In this equation a shape S in the sub scanning section is defined in a cross section including a normal to a shape in the main scanning direction at a corresponding position in the main scanning direction and being perpendicular to the deflective scan plane.

(2) Diffractive surface: diffractive surface that is expressed by a phase function including terms up to the sixth order for the main scanning direction and the second-order term differing depending upon positions in the main scanning direction, for the sub scanning direction $$\phi=m\lambda=b_2Y^2+b_4Y^4+b_6Y^6+(d_0+d_1Y+d_2Y^2+d_3Y^3+d_4Y^4)Z^2$$

(where φ is a phase function, m an order of diffraction, λ a working wavelength, Y a height from the optical axis of lens, $b_2$, $b_4$, $b_6$, $d_0$, $d_1$, $d_2$, $d_3$, $d_4$ phase coefficients, and + first-order diffracted light is used in Embodiments 1 to 3)

Although the above expressions for the refractive surfaces and diffractive surface all are expressed with the limited In the present embodiment the toric lens 61 has the entrance surface 61*a* which is an aspheric surface in the main scanning direction and which is a modified cylindrical surface flat in the sub scanning direction, and the exit surface 61*b* which is an aspheric surface in the main scanning direction and which is a curved surface in the sub scanning direction and a toric surface in which curvatures vary asymmetrically with respect to the center at the optical axis in correspondence with positions in the main scanning direction. The composite optical element 62 consists of the entrance surface 62*a* which is an aspheric surface having the power only in the main scanning direction (but which is flat in the sub scanning direction), and the exit surface 62*b* which is a diffractive surface resulting from addition of the diffraction grating 63 onto a plane.

The reason why the diffraction grating (diffracting optical element) 63 is introduced into the scanning lens system 6 in the present embodiment is that production stability of the optical element is improved by making use of the feature of the diffraction grating that the power and focus position determined by the grating position are easy to determine with relatively high accuracy, in addition to the conventional effects of compensation for chromatic aberration and temperature compensation.

In the present embodiment, as described above, the three surfaces in the main scanning direction in the scanning lens system 6 are the aspheric surfaces and the other surface is the diffractive surface, whereby the curvature of field and the f-θ characteristic in the main scanning direction are corrected well by the aspheric effect of the diffractive surface. In addition, the toric lens 61 having the largest power in the sub scanning direction in the scanning lens system 6 is located on the optical deflector 5 side with respect to the middle point between the optical deflector 5 and the surface to be scanned 8, whereby the scanning lens system 6 becomes an enlargement imaging system in the sub scanning direction, thereby improving the coupling efficiency of the collimator lens 2 and the spot shape.

Here the power allocation in the sub scanning direction in the toric lens 61 is determined as follows.

toric lens: power in the sub scanning direction $\phi_{S1}=2.51\times 10^{-2}$ entrance surface: power in the sub scanning direction $\phi_{S11}=0$ exit surface: power in the sub scanning direction $\phi_{S12}=2.51\times 10^{-2}$ It becomes feasible to decrease the variation of irradiated position and the degradation of the spot shape on the surface to be scanned 8 due to the decentration in the sub scanning direction, by satisfying the following condition in the above power allocation:

$$\phi S_{1x} < 0.2 \times \phi S_1 \quad (1)$$

$$0 < 5.02 \times 10^{-3}$$

($\phi S_1$: power in the sub scanning direction of the optical element having the largest power in the sub scanning direction $\phi S_{1x}$: power of the optical surface having the smaller power in the sub scanning direction out of the two optical surfaces of the optical element having the largest power in the sub scanning direction), i.e., by nullifying the power in the sub scanning direction of either one optical surface of the toric lens 61.

Although the toric lens 61 in the present invention has the positive power in the sub scanning direction, the present invention can also be applied to lenses having a negative power in the sub scanning direction.

In the present invention, magnitudes of powers are determined by taking absolute values of the powers and comparing magnitudes of the absolute values of the powers.

The reason why the surface shapes in the main scanning direction of the toric lens 61 according to the present invention are the aspheric shapes is that the curvature of field and distortion can be uniformly corrected well thereby from on the axis to off the axis.

The configuration wherein the surface shapes in the main scanning direction of the toric lens 61 according to the present invention are the aspheric shapes is associated with such a characteristic that sub-scan magnifications are made constant from on the axis to off the axis, and it contributes to the design capable of forming the good spot shape.

In general, the optical element having the largest power in the sub scanning direction in the scanning lens system, or the optical element located at the position closest to the deflecting element demonstrates high sensitivity to decentration, and it is thus desirable to provide the aforementioned countermeasures in these optical elements.

Figure 4:
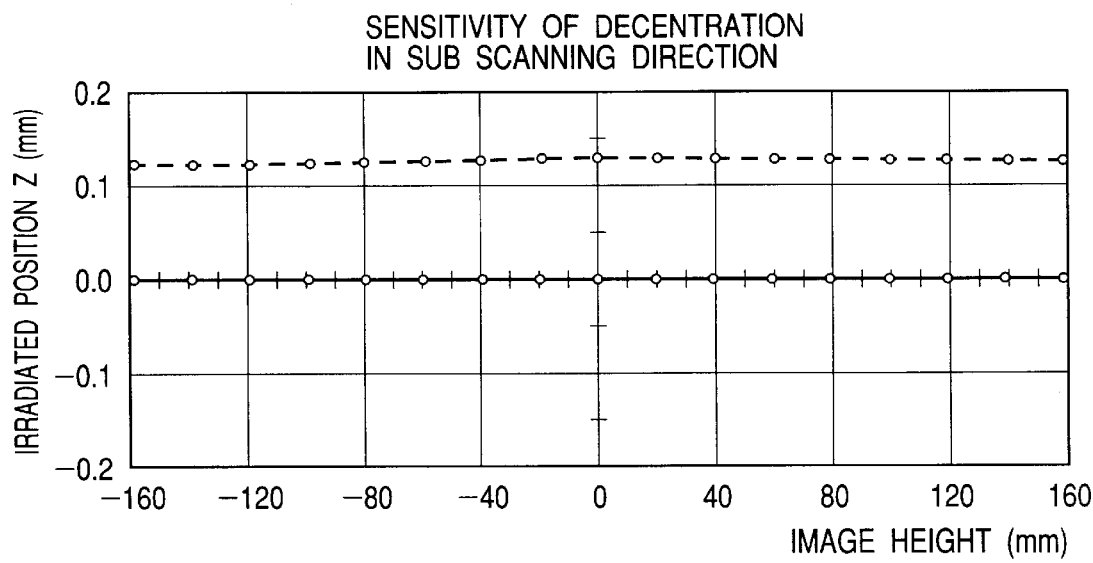
FIG. 4 is a diagram showing the variation of irradiated position due to decentration in the sub scanning direction of the toric lens in Embodiment 1 of the present invention.

FIG. 4 is a diagram showing the variation of irradiated position on the surface to be scanned 8 due to decentration in the sub scanning direction of the toric lens 61 of the present embodiment (decentration in the direction normal to the surface to be scanned), wherein a solid line represents variation due to decentration (decentration amount of 0.05 mm) of the entrance surface and a dashed line variation due to decentration (decentration amount of 0.05 mm) of the exit surface.

Figure 5:
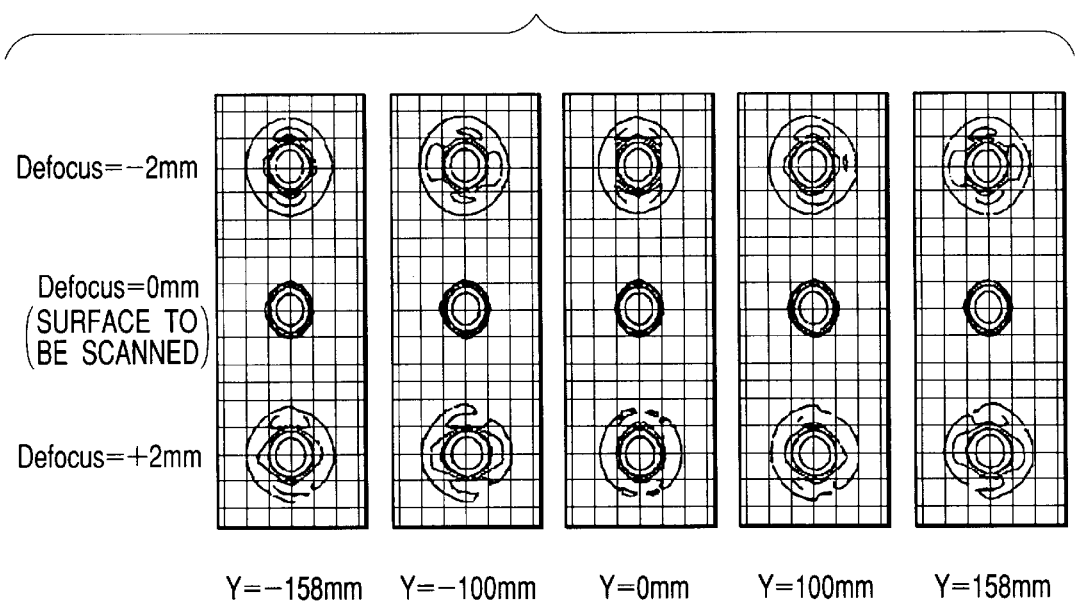
FIG. 5 is a diagram showing spot shapes with decentration in the sub scanning direction of the exit surface of the toric lens in Embodiment 1 of the present invention.

FIG. 5 is a diagram showing spot shapes due to the decentration (decentration amount of 0.05 mm) of the exit surface 61b of the toric lens 61, wherein contour lines indicating 2%, 5%, 10%, 13.5%, and 36.8% of the peak value are shown in order from the outside. It is verified from FIGS. 4 and 5 that there is the effect of decreasing the variation of irradiated position due to the decentration in the sub scanning direction and the decentration does not degrade the spot shape.

In the present embodiment, as described above, the scanning lens system 6 is composed of the toric lens 61 and the composite optical element 62 and the shape in the sub scanning direction of the entrance surface 61a of the toric lens 61 having the largest power in the sub scanning direction on the optical axis is flat (or has the power of 0 in the sub scanning direction on the optical axis) in this way, whereby the problems of the movement of the irradiated position and the degradation of the spot due to the decentration in the sub scanning direction of the scanning lens system 6 and due to the local decentration in the production steps of the molded lens can be reduced at low cost and in the simple structure, thereby yielding the multi-beam scanning optical apparatus suitable for high-quality recording with little variation of irradiated position and little pitch unevenness.

In the present embodiment the entrance surface 61a of the toric lens 61 has the power of 0 in the sub scanning direction on the optical axis, but the exit surface 61b or the both surfaces 61a and 61b may be constructed with the power of 0 in the sub scanning direction on the optical axis.

(Embodiment 2)

Figure 6:
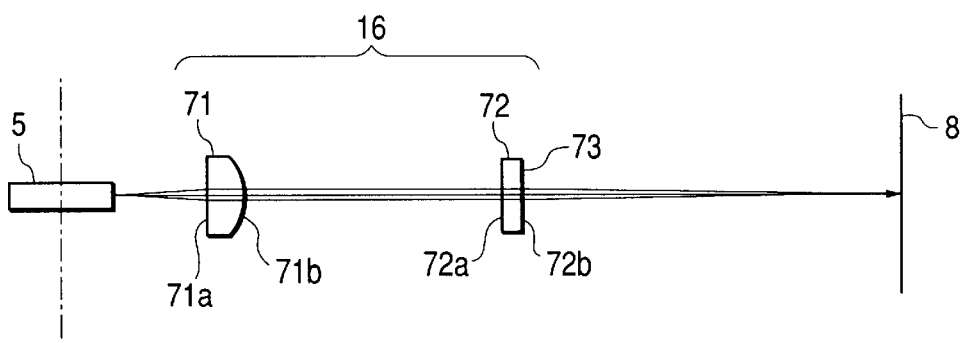
FIG. 6 is a sub scanning sectional view of the scanning optical apparatus in Embodiment 2 of the present invention.

FIG. 6 is a cross-sectional view of the major part in the sub scanning direction of the scanning optical apparatus in Embodiment 2 of the present invention (a sub scanning sectional view). The cross-sectional view of the major part in the main scanning direction is similar to aforementioned FIG. 2 (though the reference numeral of the toric lens is different).

The present embodiment is different from aforementioned Embodiment 1 in that a small curvature in the sub scanning direction is imparted to the entrance surface 71a of the toric lens 71 (the power in the sub scanning direction on the optical axis is approximately 0) and the light source means is changed to a single beam laser. The other structure and optical action are substantially the same as in Embodiment 1, thereby achieving the same effect. The statement "the power in the sub scanning direction on the optical axis is approximately 0" herein means that the power of the surface is infinitely close to 0. Specifically, as indicated by Condition (1), the power of the surface is set to less than 20% of the power of the optical element having the largest power in the sub scanning direction.

Table 2 presents the optical layout, the aspheric coefficients of the toric lens 71, and the aspheric coefficients and phase terms of the composite optical element 72 in the present embodiment.

TABLE 2

Design Data

| Wavelength & Refractive indices | | | | Surface shapes of toric lens 71 | | Surface shapes of long diffractive element 72 | |
|---|---|---|---|---|---|---|---|
| | | | | First surface | Second Surface | First surface | Second surface |
| Working wavelength | λ (nm) | 780 | | | | | |
| Refractive index of toric lens 71 | ndt | 1.53064 | R | −8.84696E+01 | −4.63992E+01 | R | −3.92336E+02 | ∞ |
| Abbe number of toric lens 71 | vdt | 55.5 | K | −5.39190E−01 | −8.46048E−01 | K | −6.01601E+01 | |
| Refractive index of long diffractive element 72 | ndd | 1.53064 | B4 | 1.16004E−06 | 3.12272E−07 | B4 | 2.11808E−07 | |
| Abbe number of long diffractive element 72 | vdd | 55.5 | B6 | 1.34535E−09 | 5.20228E−10 | B6 | −2.03707E−11 | |
| Angles of beam | | | B8 | −1.08687E−12 | 5.33696E−13 | B8 | 1.13519E−15 | |
| Angle of incidence to polygon | θp | −70.0 | B10 | 1.83812E−16 | −3.91099E−16 | B10 | −2.89613E−20 | |
| Max angle of exit from polygon | θe | 45.0 | r | 2.00000E+02 | −2.23252E+01 | Phase function of long diffractive element 62 | | |
| | | | D2s | | 1.93121E−04 | | First surface | Second surface |
| Layout | | | D4s | | −3.53300E−08 | b2 | | −2.00698E−04 |
| Polygon facet - Toric lens | e1 | 30.0 | D6s | | 3.07561E−11 | b4 | | 1.44782E−08 |
| Center thickness of toric lens | d1 | 11.0 | D8s | | | b6 | | −2.67807E−12 |
| Toric lens - Long diffractive element | e2 | 75.0 | D10s | | | b8 | | 2.30099E−16 |
| Center thickness of long diffractive element | d2 | 5.0 | D2e | | 1.24150E−04 | b10 | | −7.63301E−21 |
| Long diffractive element - Surface to be scanned | Sk | 111.0 | D4e | | 3.68971E−08 | d0 | | −5.05857E−03 |
| Axis of polygon - Surface to be scanned | L | 232.0 | D6e | | −1.10250E−11 | d1 | | 1.33222E−06 |
| Effective scan width | W | 297.0 | D8e | | | d2 | | 6.34698E−08 |
| | | | D10e | | | d3 | | −5.88783E−11 |
| | | | | | | d4 | | 7.95194E−13 |

Suffix s stands for anti-laser side
Suffix e stands for laser side
Sign + on Y axis is defined on anti-laser side In the present embodiment the toric lens 71 has the entrance surface 71a which is an aspheric surface in the main scanning direction and which is a toric surface of a spherical surface having the small power in the sub scanning direction, and the exit surface 71b which is an aspheric surface in the main scanning direction and which is a curved surface in the sub scanning direction being a toric surface whose curvatures vary corresponding to positions in the main scanning direction. The composite optical element 72 consists of the entrance surface 72a which is an aspheric surface having the power only in the main scanning direction (which is flat in the sub scanning direction), and the exit surface 72b which is a diffractive surface resulting from addition of a diffraction grating 73 onto a plane.

In the present embodiment the small curvature in the sub scanning direction is imparted to the entrance surface 71a of the toric lens 71, whereby degrees of freedom are increased for aberration correction in the sub scanning direction, thereby well correcting, particularly, for wavefront aberration thereof, as compared with aforementioned Embodiment 1. The other aberrations are also corrected well, as in Embodiment 1.

The power allocation in the sub scanning direction in the toric lens 71 herein is determined as follows.

toric lens: power in the sub scanning direction $\phi_{S1}=2.57\times10^{-2}$ entrance surface: power in the sub scanning direction $\phi_{S11}=2.62\times10^{-3}$ exit surface: power in the sub scanning direction $\phi_{S12}=2.35\times10^{-2}$ As a result, the present embodiment also satisfies aforementioned Condition (1) because of the small power in the sub scanning direction of the entrance surface 71a of the toric lens 71, which makes it feasible to decrease the variation of the irradiated position and the degradation of the spot shape on the surface to be scanned due to the decentration in the sub scanning direction.

Figure 7:
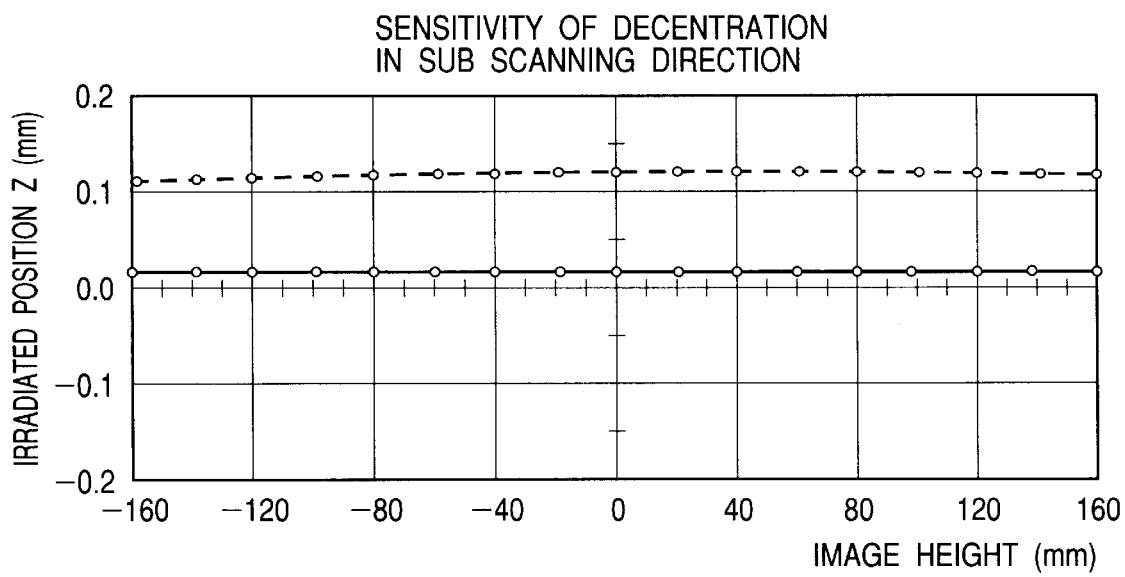
FIG. 7 is a diagram showing the variation of irradiated position due to decentration in the sub scanning direction of the toric lens in Embodiment 2 of the present invention.

FIG. 7 is a diagram showing the variation of irradiated position on the surface to be scanned due to decentration in the sub scanning direction of the toric lens 71 of the present embodiment, wherein a solid line indicates the variation due to the decentration (decentration amount of 0.05 mm) of the entrance surface and a dashed line the variation due to the decentration (decentration amount of 0.05 mm) of the exit surface. It is verified from the figure that there is the effect of decreasing the variation of irradiated position due to the decentration in the sub scanning direction.

In the present embodiment, as described above, the scanning lens system 16 is composed of the toric lens 71 and the composite optical element 72, and the shape in the sub scanning direction of the entrance surface 71a of the toric lens 71 having the largest power in the sub scanning direction on the optical axis is the spherical shape with the small power in this way, whereby the problems of the variation of irradiated position and the degradation of spot due to the decentration in the sub scanning direction of the scanning lens system 16 and due to the local decentration in the production steps of the molded lens can be reduced at low cost and in the simple configuration, thereby yielding the optical scanning apparatus suitable for the high-quality recording with little variation of irradiated position and little degradation of spot.

Since degrees of freedom in the sub scanning direction are increased by one as a specific effect of the present embodiment, the wavefront aberration can be corrected for well, which makes it feasible to realize the scanning optical apparatus capable of focusing a fine spot.

In the present embodiment the light source means was the single beam laser, but the light source means may be constructed of a multi-beam laser.

(Embodiment 3)

Figure 8:
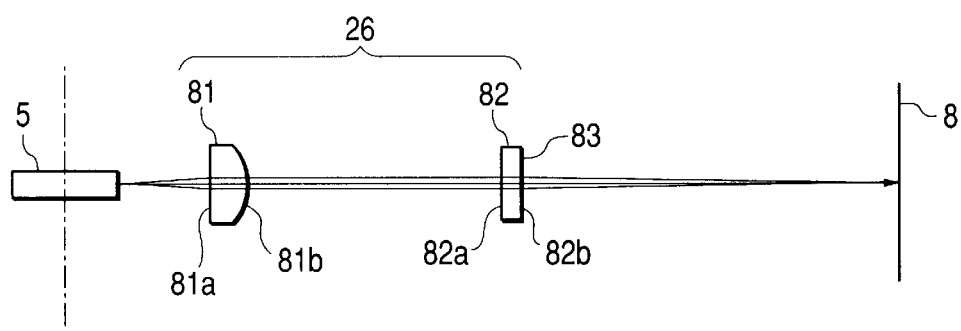
FIG. 8 is a sub scanning sectional view of the scanning optical apparatus in Embodiment 3 of the present invention.

FIG. 8 is a cross-sectional view of the major part in the sub scanning direction of the scanning optical apparatus in Embodiment 3 of the present invention (a sub scanning sectional view). The cross-sectional view of the major part in the main scanning direction is similar to aforementioned FIG. 2 (though the reference numeral of the toric lens is different).

The present embodiment is different from aforementioned Embodiment 1 in that a small curvature in the sub scanning direction is imparted to the entrance surface 82a of the composite optical element 82 (the power in the sub scanning direction on the optical axis is approximately 0). The other structure and optical action are substantially the same as in Embodiment 1, thereby achieving the same effect.

Table 3 presents the optical layout, the aspheric coefficients of the toric lens 81, and the aspheric coefficients and phase terms of the composite optical element 82 in the present embodiment.

the composite optical element 82, which makes it feasible to increase degrees of freedom for aberration correction in the sub scanning direction and to set image magnifications low in the sub scanning direction of the scanning lens system 26, as compared with aforementioned Embodiment 1.

The power allocation in the sub scanning direction in the toric lens 81 herein is determined as follows.

toric lens: power in the sub scanning direction $\phi_{S1}=2.09\times 10^{-2}$ entrance surface: power in the sub scanning direction $\phi_{S11}=0$ exit surface: power in the sub scanning direction $\phi_{S12}=2.09\times 10^{-2}$ As a consequence, the present embodiment also satisfies aforementioned Condition (1) because of the power of 0 in the sub scanning direction of the entrance surface 81a of the toric lens 81, which makes it feasible to decrease the variation of irradiated position and the degradation of the spot shape on the surface to be scanned due to the decentration in the sub scanning direction.

TABLE 3

Design Data

| Wavelength & Refractive indices | | | Surface shapes of toric lens 81 | | | Surface shapes of long diffractive element 82 | |
|---|---|---|---|---|---|---|---|
| Working wavelength | | | First surface | Second Surface | | First surface | Second surface |
| Refractive index of toric lens 81 | ndt | 1.53064 | R | −8 84696E+01 | −4.63992E+01 | R | −3.92336E+02 | ∞ |
| Abbe number of toric lens 81 | vdt | 55.5 | K | −5.39190E−01 | −8.46048E−01 | K | −6.01601E+01 | |
| Refractive index of long diffractive element 82 | ndd | 1.53064 | B4 | 1.16004E−06 | 3.12272E−07 | B4 | 2.11808E−07 | |
| Abbe number of long diffractive element 82 | vdd | 55.5 | B6 | 1.34535E−09 | 5.20228E−10 | B6 | −2.03707E−11 | |
| Angles of beam | | | B8 | −1.08687E−12 | 5.33696E−13 | B8 | 1.13519E−15 | |
| Angle of incidence to polygon | θp | −70.0 | B10 | 1.83812E−16 | −3.91099E−16 | B10 | −2.89613E−20 | |
| Max angle of exit from polygon | θe | 45.0 | r | 0.00000E+00 | −2.51169E+01 | r | 1.00000E+02 | |
| | | | D2s | | 1.37616E−04 | Phase function of long diffractive element 62 | |
| Layout | | | D4s | | −1.79581E−08 | | First surface | Second surface |
| Polygon facet - Toric lens | e1 | 30.0 | D6s | | −2.90847E−11 | b2 | | −2.00698E−04 |
| Center thickness of toric lens | d1 | 11.0 | D8s | | | b4 | | 1.44782E−08 |
| Toric lens - Long diffractive element | e2 | 75.0 | D10s | | | b6 | | −2.67807E−12 |
| Center thickness of long diffractive element | d2 | 5.0 | D2e | | 9.05596E−05 | b8 | | 2.30099E−16 |
| Long diffractive element - Surface to be scanned | Sk | 111.0 | D4e | | 2.70935E−08 | b10 | | −7.63301E−21 |
| Axis of polygon - Surface to be scanned | L | 232.0 | D6e | | −5.09823E−11 | d0 | | −3.84476E−03 |
| Effective scan width | W | 297.0 | D8e | | | d1 | | 1.07962E−06 |
| | | | D10e | | | d2 | | 1.75149E−08 |
| | | | | | | d3 | | −4.14838E−11 |
| | | | | | | d4 | | −1.11735E−13 |

Suffix s stands for anti-laser side
Suffix e stands for laser side
Sign + on Y axis is defined on anti-laser side In the present embodiment the toric lens 81 consists of the entrance surface 81a which is an aspheric surface in a scanning direction and which is a modified cylindrical surface flat in the sub scanning direction, and the exit surface 81b which is an aspheric surface in the main scanning direction and which is a curved surface in the sub scanning direction being a toric surface curvatures of which vary corresponding to positions in the main scanning direction. The composite optical element 82 consists of the entrance surface 82a which is an aspheric surface in the main scanning direction and which is a toric surface of a spherical surface having the small power in the sub scanning direction, and the exit surface 82b which is a diffractive surface resulting from addition of a diffraction grating 83 onto a plane.

Figure 9:
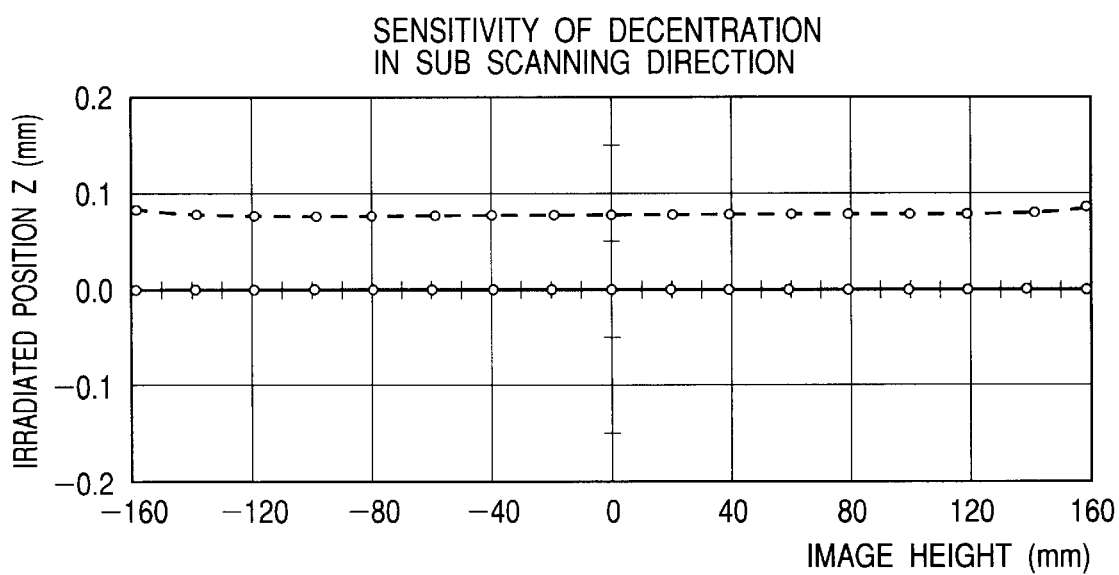
FIG. 9 is a diagram showing the variation of irradiated position due to decentration in the sub scanning direction of the toric lens in Embodiment 3 of the present invention.
Figure 13:
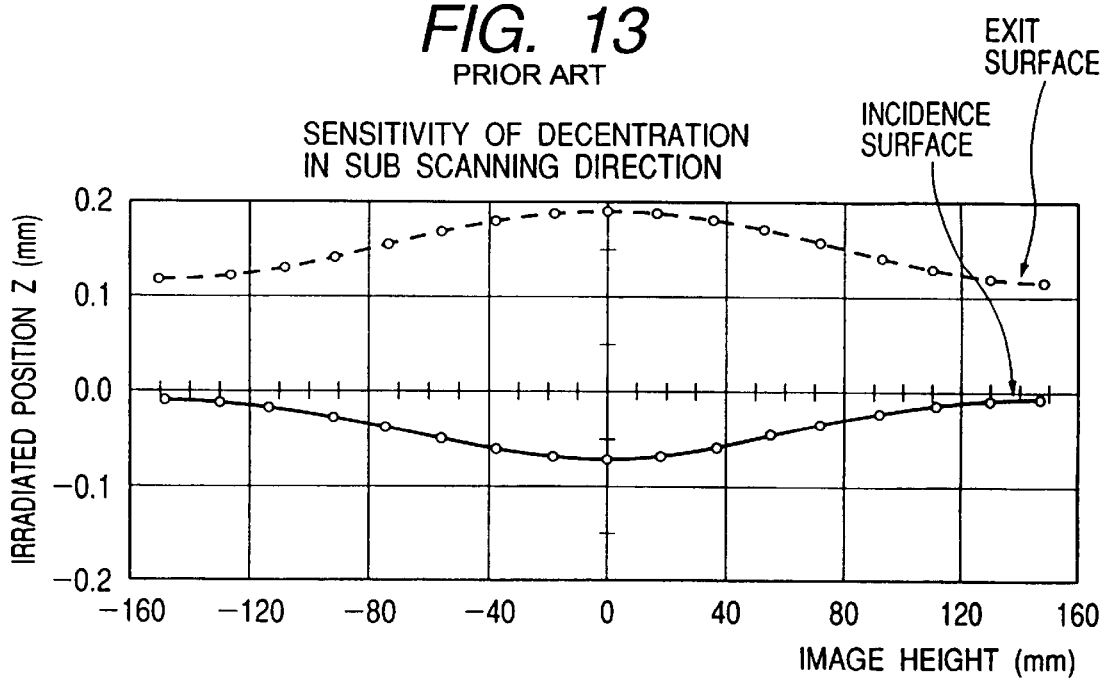
FIG. 13 is a diagram showing the variation of irradiated position due to decentration in the sub scanning direction of the toric lens in the conventional example.

In the present embodiment the small curvature in the sub scanning direction is imparted to the entrance surface 82a of FIG. 9 is a diagram showing the variation of irradiated position on the surface to be scanned due to the decentration in the sub scanning direction of the toric lens 81 of the present embodiment, wherein a solid line indicates the variation due to the decentration (decentration amount of 0.05 mm) of the entrance surface and a dashed line the variation due to the decentration (decentration amount of 0.05 mm) of the exit surface. The effect of decreasing the variation of the irradiated position is also verified from comparison of the same figure with the aforementioned conventional example of FIG. 13.

In the present embodiment, as described above, the scanning lens system 26 is composed of the toric lens 81 and the composite optical element 82, the shape in the sub scanning direction of the entrance surface 81a is flat in the toric lens 81 having the largest power in the sub scanning direction on the optical axis out of the two elements, and the shape in the sub scanning direction of the entrance surface 82a of the composite optical element 82 is the spherical shape having the small power in this way, whereby the problems of the movement of the irradiated position and the degradation of the spot due to the decentration in the sub scanning direction of the scanning lens system 26 and due to the local decentration in the production steps of the molded lens can be reduced at low cost and in the simple configuration, thereby yielding the scanning optical apparatus suitable for the high-quality recording with little variation of irradiated position and little degradation of the spot.

(Image-forming Apparatus)

Figure 10:
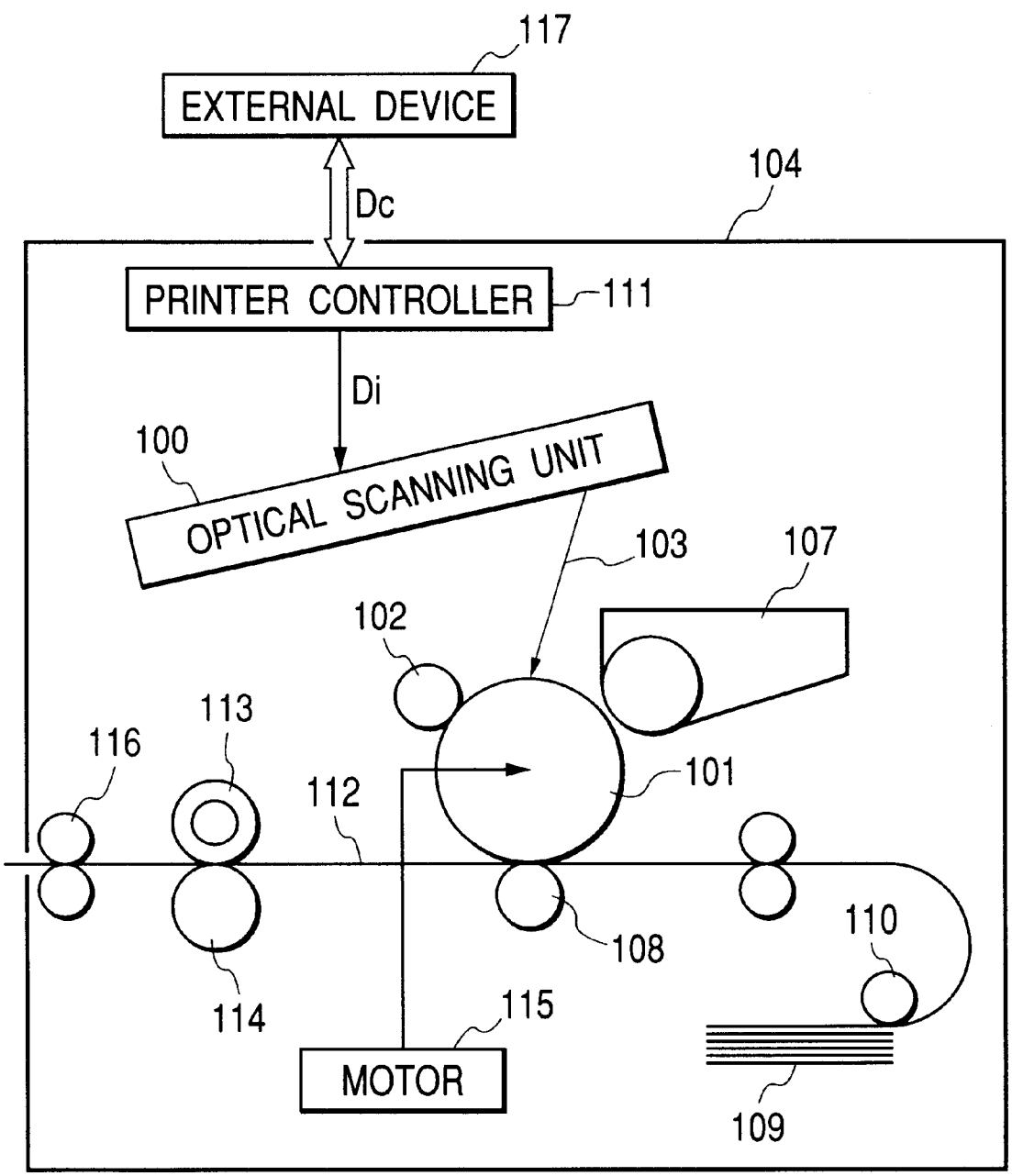
FIG. 10 is a cross-sectional view showing the major part in the sub scanning direction of a configuration example of the image-forming apparatus (electrophotographic printer) incorporating the scanning optical apparatus of the present invention.

FIG. 10 is a cross-sectional view of the major part in the sub scanning direction of an embodiment of the image-forming apparatus (electrophotographic printer) incorporating the scanning optical apparatus as set forth in either one of Embodiments 1 to 3 of the present invention. In FIG. 10, numeral 104 designates the image-forming apparatus. This image-forming apparatus 104 accepts input of code data Dc from an external device 117 such as a personal computer or the like. This code data Dc is converted into image data (dot data) Di by a printer controller 111 inside the apparatus. This image data Di is supplied into an optical scanning unit (scanning optical apparatus) 100. Then this optical scanning unit 100 emits a light beam (beam) 103 modulated according to the image data Di and this light beam 103 scans a photosensitive surface of photosensitive drum 101 in the main scanning direction.

The photosensitive drum 101 being an electrostatic latent image carrier (photosensitive body) is rotated clockwise by a motor 115. As the drum rotates in this way, the photosensitive surface of the photosensitive drum 101 moves in the sub scanning direction perpendicular to the main scanning direction, relative to the light beam 103. Above the photosensitive drum 101, a charging roller 102 for uniformly charging the surface of the photosensitive drum 101 is disposed so as to contact the surface of the photosensitive drum. Then the surface of the photosensitive drum 101 charged by the charging roller 102 is irradiated with the light beam 103 as scanned by the optical scanning unit 100.

As described previously, the light beam 103 is modulated based on the image data Di and thus the irradiation with this light beam 103 results in forming an electrostatic latent image on the surface of the photosensitive drum 101. This electrostatic latent image is developed into a toner image by a developing unit 107 located so as to contact the photosensitive drum 101 downstream in the rotating direction of the photosensitive drum 101 with respect to the irradiated position with the light beam 103. Toner particles used herein have, for example, a polarity opposite to that of the charge given by the charging roller 102, and non-irradiated portions of the photosensitive drum become toner-adhering portions (drawing portions), thus effecting so-called normal development. Alternatively, it is also possible to employ reversal development wherein toner adheres to irradiated portions of the photosensitive drum.

The toner image developed by the developing unit 107 is transferred onto a sheet 112 being a transfer medium by a transfer roller 108 disposed so as to face the photosensitive drum 101, below the photosensitive drum 101. Sheets 112 are stored in a sheet cassette 109 located before the photosensitive drum 101 (on the right side in FIG. 10), and it is also possible to implement sheet feeding by manual paper feeding. A sheet feed roller 110 is located at the end of sheet cassette 109 to feed a sheet 112 from the sheet cassette 109 into a conveyance path.

The sheet 112, onto which an unfixed toner image has been transferred as described above, is further conveyed to a fixing unit behind the photosensitive drum 101 (on the left side in FIG. 10). The fixing unit is composed of a fixing roller 113 having a fixing heater (not shown) inside, and a pressing roller 114 located so as to be pressed against the fixing roller 113. The fixing roller heats the sheet 112 conveyed from the transferring section, while pressing it at a nip portion between the fixing roller 113 and the pressing roller 114, thereby fixing the unfixed toner image on the sheet 112. Sheet discharging rollers 116 are positioned further behind the fixing roller 113 to discharge the fixed sheet 112 to the outside of the image-forming apparatus.

Although not shown in FIG. 10, the print controller 111 does not perform only the conversion of data described above, but also executes control of various parts including the motor 115, each section in the image-forming apparatus, the polygon motor in the optical scanning unit 100, and so on.

(Color Image-forming Apparatus)

Figure 11:
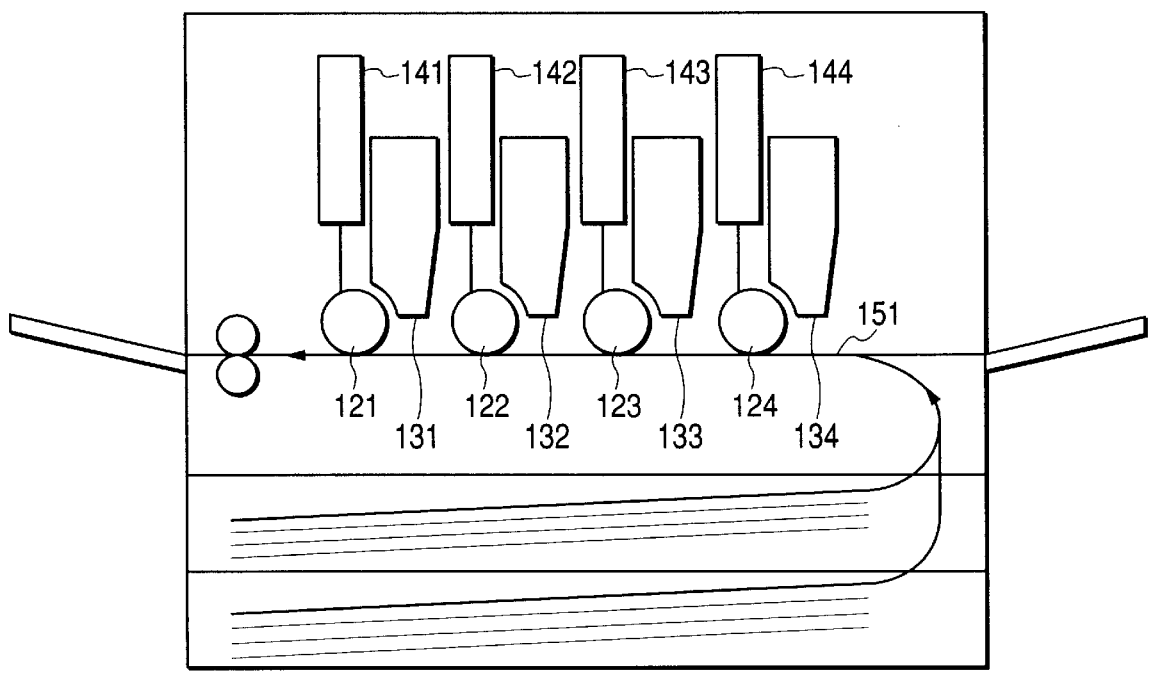
FIG. 11 is a schematic view showing the major part of a color image-forming apparatus according to the present invention.
Figure 12:
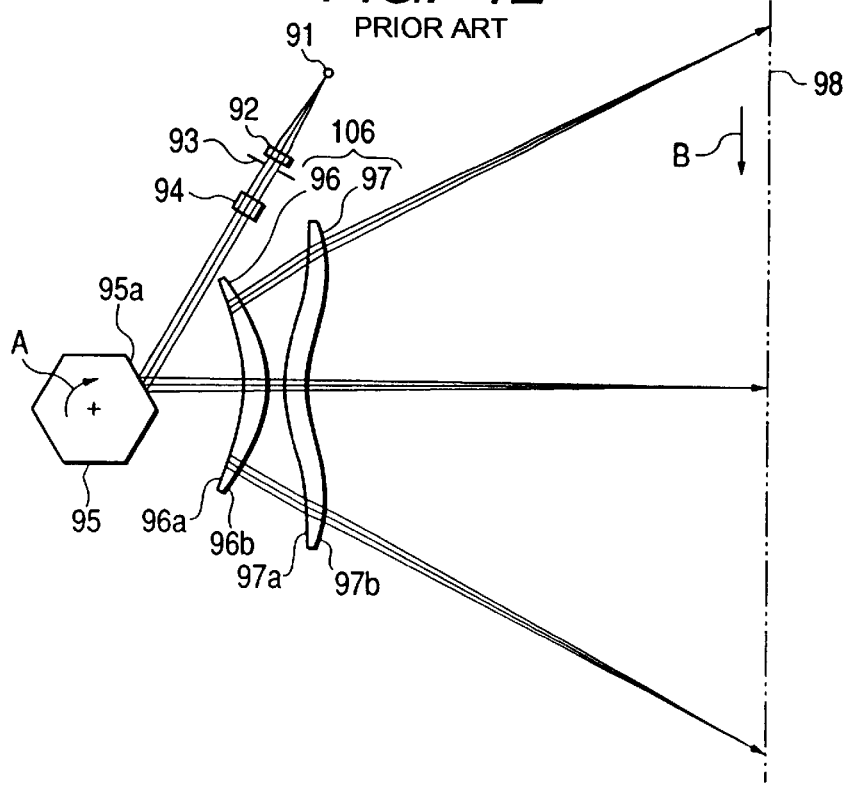
FIG. 12 is a main scanning sectional view of a conventional scanning optical apparatus.

FIG. 11 is a schematic view of the major part of a color image-forming apparatus of a tandem type incorporating a plurality of scanning optical apparatus as set forth in either one of aforementioned Embodiments 1 to 3, in tandem and constructed to record images of respective colors on photosensitive drum surfaces different from each other to form a color image.

In FIG. 11 reference numerals 141, 142, 143, 144 designate scanning optical devices as set forth in either one of aforementioned Embodiments 1 to 3, numerals 121, 122, 123, 124 photosensitive drums as respective image carriers, numerals 131, 132, 133, 134 developing units, and numeral 151 a conveying belt.

In the same figure the scanning optical devices 141 to 144 record image information of respective colors (C (cyan), M (magenta), Y (yellow), and B (black)) on the corresponding surfaces of the respective photosensitive drums 121 to 124 to form a color image. Since the color image recording apparatus of this type is designed to record an image by superposition of plural scan lines, deviation of print positions of the respective colors will lead to color registration and, in turn, degradation of image quality.

Thus the present embodiment employs the scanning optical devices according to either of Embodiments 1 to 3 of the present invention, which are reduced in the sensitivity of the variation of irradiated position in the sub scanning direction, thereby decreasing the degradation of image quality of the color image-forming apparatus due to the color registration.

The above described the color image-forming apparatus of the tandem type requiring the highest accuracy with reference to FIG. 11, but it is obvious that the effect of the present invention can be enjoyed regardless of types of the scanning optical devices, e.g., either color or black-and-white, either a single-beam light source or a multi-beam light source, and so on.

According to the present invention, as described above, the third optical element for focusing the beam deflected by the deflecting element on the surface to be scanned is composed of a plurality of optical elements, the optical element having the largest power in the sub scanning direction on the optical axis out of the optical elements is located on the deflecting element side with respect to the middle point between the deflecting element and the surface to be scanned, the shape of at least one surface in the main scanning direction is the aspheric shape, and at least one surface has the power of 0 or approximately 0 in the sub scanning direction on the optical axis, whereby the sensitivity can be reduced to decentration in the sub scanning direction of the optical system, which permits the problems of the movement of the irradiated position and the degradation of the spot due to the decentration in the sub scanning direction of the third optical element to be reduced at low cost and in the simple structure, thus achieving the scanning optical apparatus suitable for the high-quality recording with little pitch unevenness, little color registration, or the like and the color image-forming apparatus using it.

What is claimed is:

1. A scanning optical apparatus comprising:

light source means;

a deflecting element for deflecting and reflecting a beam emitted from said light source means; and a scanning optical element for focusing the beam deflected by said deflecting element, on a surface to be scanned, wherein said scanning optical element comprises a plurality of optical elements, wherein an optical element having the largest magnitude of power in a sub scanning direction on the optical axis out of said plurality of optical elements is located on the deflecting element side with respect to a middle point in an optical-axis direction between the deflecting element and the surface to be scanned, wherein said optical element having the largest magnitude of power in the sub scanning direction has two optical surfaces, wherein, where $\phi S_1$ represents a magnitude of power in the sub scanning direction of said optical element having the largest magnitude of power in the sub scanning direction and $\phi S_{1X}$ represents a magnitude of power of an optical surface having a smaller magnitude of power in the sub scanning direction out of the two optical surfaces of said optical element having the largest magnitude of power in the sub scanning direction, the following condition is satisfied:

$$\phi S_{1X} < 0.2 \times \phi S_1$$

wherein a shape in the main scanning direction of at least one surface out of the two optical surfaces of said optical element having the largest magnitude of power in the sub scanning direction is an aspheric shape.

2. The scanning optical apparatus according to claim 1, wherein said optical element having the largest magnitude of power in the sub scanning direction is located at a position closest to said deflecting element in the optical-axis direction.

3. The scanning optical apparatus according to claim 1, wherein only said optical element having the largest magnitude of power in the sub scanning direction on the optical axis out of said plurality of optical elements is located on the deflecting element side with respect to the middle point in the optical-axis direction between said deflecting element and the surface to be scanned.

4. The scanning optical apparatus according to claim 1, wherein the magnitude of power $\phi S_{1X}$ of the optical surface having the smaller magnitude of power in the sub scanning direction out of the two optical surfaces of said optical element having the largest magnitude of power in the sub scanning direction is 0.

5. The scanning optical apparatus according to claim 1, wherein an optical element other than said optical element having the largest magnitude of power in the sub scanning direction out of said plurality of optical elements, also has an optical surface a magnitude of power of which in the sub scanning direction on the optical axis is less than 20% of the magnitude of power $\phi S_1$ in the sub scanning direction of said optical element having the largest magnitude of power in the sub scanning direction.

6. The scanning optical apparatus according to claim 5, wherein, concerning all refracting surfaces of optical elements other than said optical element having the largest magnitude of power in the sub scanning direction out of said plurality of optical elements, magnitudes of powers thereof in the sub scanning direction on the optical axis are less than 20% of the magnitude of power $\phi S_1$ in the sub scanning direction of said optical element having the largest magnitude of power in the sub scanning direction.

7. The scanning optical apparatus according to claim 1, wherein said optical element having the largest magnitude of power in the sub scanning direction is a molded lens.

8. The scanning optical apparatus according to claim 1, wherein said scanning optical element comprises a diffracting optical element.

9. The scanning optical apparatus according to claim 1, wherein shapes in the main scanning direction of both of the two optical surfaces of said optical element having the largest magnitude of power in the sub scanning direction are aspheric shapes.

10. The scanning optical apparatus according to claim 1, wherein said light source means is a multi-beam light source having a plurality of light emitting portions capable of being optically modulated independently of each other.

11. A scanning optical apparatus comprising:

light source means;

a deflecting element for deflecting and reflecting a beam emitted from said light source means; and a scanning optical element for focusing the beam deflected by said deflecting element, on a surface to be scanned, wherein said scanning optical element comprises a plurality of optical elements, wherein a shape in a main scanning direction of at least one surface out of optical surfaces of said plurality of optical elements is an aspheric shape, wherein an optical element having a largest magnitude of power in a sub scanning direction on the optical axis out of said plurality of optical elements is located on the deflecting element side with respect to a middle point in an optical-axis direction between the deflecting element and said surface to be scanned, wherein the optical element having the largest magnitude of power in the sub scanning direction has two optical surfaces, wherein, where $\phi S_1$ represents a magnitude of power in the sub scanning direction of the optical element having the largest magnitude of power in the sub scanning direction and $\phi S_{1X}$ a magnitude of power of an optical surface having a smaller magnitude of power in the sub scanning direction out of the two optical surfaces of the optical element having the largest magnitude of power in the sub scanning direction, the following condition is satisfied:

$$\phi S_{1X} < 0.2 \times \phi S_1$$

wherein said optical element having the largest magnitude of power in the sub scanning direction is a molded lens.

12. An image-forming apparatus comprising:

said scanning optical apparatus as set forth in any one of claims 1 and 11;

a photosensitive member placed at the surface to be scanned;

a developing unit for developing an electrostatic latent image formed on said photosensitive member with a beam under scan by said scanning optical apparatus into a toner image;

a transferring unit for transferring the toner image thus developed onto a transfer medium; and a fixing unit for fixing the toner image thus transferred on the transfer medium.

13. An image-forming apparatus comprising:

said scanning optical apparatus as set forth in any one of claims 1 and 11; and a printer controller for converting code data supplied from an external device into an image signal and for supplying the image signal into said scanning optical apparatus.

14. A color image-forming apparatus comprising:

a plurality of scanning optical apparatuses as set forth in any one of claims 1 and 11, wherein a plurality of beams emitted from the respective scanning optical apparatus are guided onto a plurality of corresponding image carrier surfaces, and areas on the plurality of image carrier surfaces are scanned with the respective beams to form a color image.

15. The scanning optical apparatus according to claim 11, wherein said optical element having the largest magnitude of power in the sub scanning direction is located at a position closest to said deflecting element in the optical-axis direction.

16. The scanning optical apparatus according to claim 11, wherein only said optical element having the largest magnitude of power in the sub scanning direction on the optical axis out of said plurality of optical elements is located on the deflecting element side with respect to the middle point in the optical-axis direction between said deflecting element and the surface to be scanned.

17. The scanning optical apparatus according to claim 11, wherein the magnitude of power $\phi S_{1X}$ of the optical surface having the smaller magnitude of power in the sub scanning direction out of the two optical surfaces of said optical element having the largest magnitude of power in the sub scanning direction is 0.

18. The scanning optical apparatus according to claim 11, wherein an optical element other than said optical element having the largest magnitude of power in the sub scanning direction out of said plurality of optical elements, also has an optical surface a magnitude of power of which in the sub scanning direction on the optical axis is less than 20% of the magnitude of power $\phi S_1$ in the sub scanning direction of said optical element having the largest magnitude of power in the sub scanning direction.

19. The scanning optical apparatus according to claim 18, wherein, concerning all refracting surfaces of optical elements other than said optical element having the largest magnitude of power in the sub scanning direction out of said plurality of optical elements, magnitudes of powers thereof in the sub scanning direction on the optical axis are less than 20% of the magnitude of power $\phi S_1$ in the sub scanning direction of said optical element having the largest magnitude of power in the sub scanning direction.

20. The scanning optical apparatus according to claim 11, wherein said scanning optical element comprises a diffracting optical element.

21. The scanning optical apparatus according to claim 11, wherein shapes in the main scanning direction of both of the two optical surfaces of said optical element having the largest magnitude of power in the sub scanning direction are aspheric shapes.

22. The scanning optical apparatus according to claim 11, wherein said light source means is a multi-beam light source having a plurality of light emitting portions capable of being optically modulated independently of each other.

23. The scanning optical apparatus according to claim 22, wherein a shape in the main scanning direction of at least one surface out of the two optical surfaces of said optical element having the largest magnitude of power in the sub scanning direction is an aspheric shape.

* * * * *